United States Patent [19]

Ohsol

[11] Patent Number: 5,738,762
[45] Date of Patent: Apr. 14, 1998

[54] SEPARATING OIL AND WATER FROM EMULSIONS CONTAINING TOXIC LIGHT ENDS

[76] Inventor: Ernest O. Ohsol, 711 Hyannisport North, Crosby, Tex. 77532-5515

[21] Appl. No.: 400,591

[22] Filed: Mar. 8, 1995

[51] Int. Cl.$^6$ ............................................ B01D 3/06
[52] U.S. Cl. .................. 203/11; 159/2.1; 159/4.04; 159/16.3; 159/48.1; 203/88; 203/90; 203/92; 203/93; 203/94; 203/95; 203/96; 203/97; 203/98
[58] Field of Search .......................... 203/11, 14, 93, 203/94, 98, 90, 88, 95, 96, 97, 49, 92; 159/2.1, 4.04, 48.1, 16.3; 202/236; 210/774, 708; 208/185, 187; 585/807

[56] References Cited

U.S. PATENT DOCUMENTS

| | | | |
|---|---|---|---|
| 4,205,962 | 6/1980 | Marion et al. | 48/197 R |
| 4,270,974 | 6/1981 | Greenfield et al. | 159/16.3 |
| 4,686,049 | 8/1987 | Koblenzer et al. | 210/774 |
| 4,938,876 | 7/1990 | Ohsol | 210/708 |
| 5,361,514 | 11/1994 | Lahoda et al. | 34/391 |

OTHER PUBLICATIONS

A. Rhoades, "New Process Effectively Recovers Oil from Refinery Waste Streams," Oil & Gas Journal, Aug. 15, 1994, pp. 92 to 94.

Primary Examiner—Virginia Manoharan

[57] ABSTRACT

An improved process for separating oil and water from an emulsion containing toxic light ends by flashing the heated and pressurized emulsion, condensing and separating the vaporized water and light ends, recovering the light ends, and recycling the condensed water. The resulting liquid water product has a reduced content of toxic light ends, such as benzene.

17 Claims, 1 Drawing Sheet

SEPARATING OIL AND WATER FROM EMULSIONS CONTAINING TOXIC LIGHT ENDS

BACKGROUND OF THE INVENTION

The invention relates to the separation of oil and water from emulsions containing the same, and particularly to separating oil and water from emulsions which also contain toxic light ends.

Oil and water emulsions usually contain some finely divided solids and are found in oil refineries, storage tanks, used motor oil disposal sites, and other locations. Some emulsions are naturally occurring, such as are produced from some oil wells; other emulsions are produced, intentionally or not, during the transportation, storage or use of oil. Any finely divided solids contained therein tend to stabilize the emulsions. Many of these emulsions contain toxic light ends, such as benzene, carbon tetrachloride, carbon disulfide or the like. Water separated from such emulsions have typically contained unacceptably high levels of these toxic light ends, such as 100 wppm and higher benzene content. Post-treatment of the separated water in order to achieve reduction of the toxic light ends content to more acceptable levels, such as 10 wppm or less, is very costly.

Numerous processes have been proposed and used to separate oil and water from emulsions. U.S. Pat. No. 4,938,876 discloses one such process which has been particularly successful. Many emulsions contain benzene or other partially water soluble toxic light ends which may solubilize in the water phase of an emulsion and which remain with one or more of the water streams generated during the separation process, resulting in a separated water product with an unacceptably high toxic light ends content. With ever more stringent environmental requirements demanding a more complete separation and purer products, there is a need for an even more effective process.

Accordingly, there is a need for an improved separation process which not only successfully separates the water, oil and solids, but which also reduces the toxic light ends content of the separated water to an environmentally acceptable level.

SUMMARY OF THE INVENTION

This invention provides an improved process for separating oil and water from emulsions, in which the toxic light ends content of the separated water is reduced to very low levels. More particularly, this invention provides a process in which an emulsion containing water, oil and toxic light ends is heated under a superatmospheric pressure, and then is flashed into a flash vessel; the flashed vapor (containing a portion of the water and the toxic light ends) is cooled to condense the flashed water and light ends; the condensed light ends are separated and recovered; and the condensed water is recycled. The water and oil (and any solids) exiting the bottom of the flash vessel are separated by conventional means, such as a tri-canter centrifuge. As a consequence of the light ends recovery and condensed water recycle steps, the water product(s) from the process has (have) a substantially reduced toxic light ends content.

In one embodiment of my invention, the flash vessel is a flash fractionator having at least one vapor-liquid contacting device; and the vapor flashed from the emulsion flows upwardly through such contacting device and is countercurrently contacted with at least a portion of the recycled condensed water. Optionally, another portion of the condensed water may be recycled into the emulsion feed upstream of the flash vessel, preferable upstream of the point where the emulsion is pressurized and heated.

In another embodiment, the recycled water may be pressurized and converted to steam for injection into the pressurized emulsion feed, thereby providing at least a portion of the energy for heating the emulsion feed.

In yet another embodiment, a stripping medium (such as steam) may be introduced into the flash vessel below the entry point of the emulsion in order to provide additional stripping of toxic light ends from the downwardly flowing oil and water mixture. Such additional stripping may be aided by including a vapor-liquid contacting device (such as a baffle chamber) between the injection point of the steam and the entry point of the emulsion.

DETAILED DESCRIPTION OF THE INVENTION

Oil and water emulsions are processed by my invention in order to separate the oil and any solids from the water, and to separate any solids from the oil and water, and to produce a separated water product which is sufficiently low in toxic light ends content that it can be used or disposed of without concern for residual toxic light ends. The basic flow scheme for the preferred emulsion treating process is disclosed in my U.S. Pat. No. 4,938,876; however, such flow scheme is modified by my present invention to incorporate the condensation of vapors flashed in the flash vessel, the separation of the condensed toxic light ends, and the recycle of the condensed water, which modifications result in a substantially reduced toxic light ends content in the total liquid water product. The disclosure of U.S. Pat. No. 4,938,876 is herein incorporated by reference.

Figure 1:
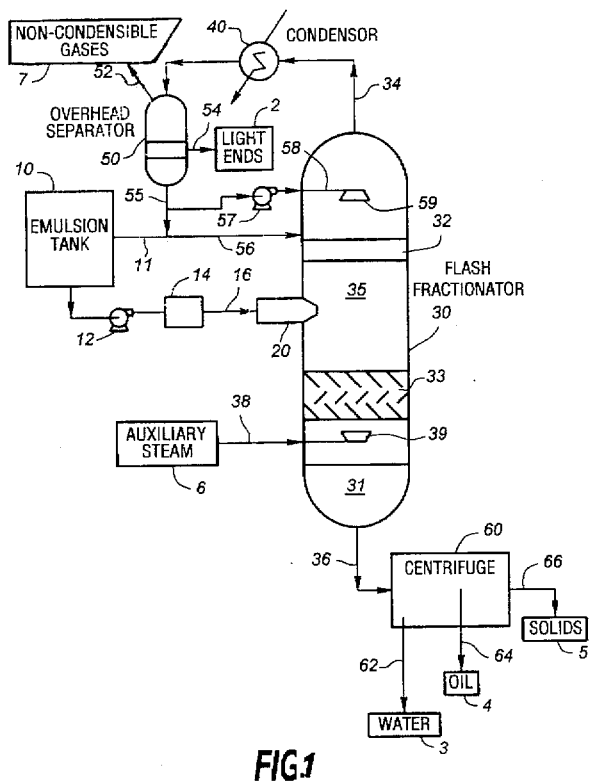
FIGS. 1 and 2 are schematic diagrams showing various embodiments of my invention.

Referring to FIG. 1, an oil-water-solids emulsion from emulsion tank 10 is pressurized to a superatmospheric pressure by pump 12, and is heated in heater 14 to a temperature well above the boiling point of water at the pressure of vessel 30. The emulsion can be heated in heater 14 by a number of different means, including fired heating, steam injection, microwave radiation, or the like, with steam injection being preferred. Optionally, effective emulsion-breaking surfactants may be injected in small quanitites before or after heater 14. The pressurized and heated emulsion is flowed through a line 16 and a nozzle 20 (such as a Venturi nozzle) tangentially into vessel 30 wherein a portion of the water and the toxic light ends flash to vapor. The flashed vapors flow upwardly through vessel 30 and line 34 into condensor 40. In condensor 40, the vapors are cooled sufficiently to condense a major portion, preferably essentially all, of the toxic light ends and the water vapor to form liquid light ends and water condensate which are allowed to separate from each other in overhead separator 50. Uncondensed vapors and non-condensable gases (if any) [7] are vented through a line 52; condensed light ends [2] are drawn off through a line 54; and condensed water is recycled through line 55. Although not shown, conventional means (such as a caustic scrubber) can be provided in vent line 52 to treat any undesirable components (such as hydrogen sulfide or ammonia) in the non-condensable gases.

The stage of the process to which the condensed water from overhead separator 50 is recycled is a matter of choice. Three such choices are shown in FIG. 1: recycle through lines 55 and 56 to a vapor-liquid contacting device 32 disposed within the vapor space 35 of flash vessel 30; recycle through line 55 and line 58 (after pressurization by a pump 57) for spraying through nozzle 59 disposed within flash vessel 30; and recycle through lines 55 and 11 into emulsion tank 10. Other recycle choices are possible, including those disclosed in the discussion of FIG. 2 below.

Irrespective of the recycle choice selected, the unflashed mixture of liquid oil and liquid water (including any solids) pass downwardly through vessel 30, and form a body of liquid 31 in the bottom of vessel 30. This mixture is withdrawn from vessel 30 through line 36 into a conventional oil, and water, and (if necessary) solids separation device 60, such as a tri-canter centrifuge, from which a separated water product [3] is produced through line 62, a separated oil product [4] is produced through line 64, and a separated solids product [5], if any, is produced through line 66.

Referring now to one of the recycle choices shown in FIG. 1, condensed water from overhead separator 50 is recycled through lines 55 and 56 into a vapor-liquid contacting device 32. Vapor-liquid contacting device 32 can be one of many such devices known in the art, including, but not limited to, demisting pads, bubble cap trays, perforated plates, or a screen supporting suitable porous packing material. Within device 32, the condensed water flows downwardly in countercurrent contact with the flashed vapors flowing upwardly through flash vessel 30. The vapors rising through vessel 30 provide a heating and stripping action to remove residual toxic light ends which might otherwise be entrained or dissolved in the condensed water returning from overhead separator 50. Also, the downwardly flowing liquid serves to partially condense and wash the vaporized water flowing upwardly through vessel 30, aiding again in separation of water with reduced toxic light ends content. The temperatures, pressures and flow rates, as well as the degree and manner of contacting the downwardly flowing condensed water and the upwardly flowing vapor, should be selected to achieve the desired result of stripping residual light ends from the condensed water. Such selections are within the skill of the art, once my objectives have been stated. Residual light ends stripped from the water condensate exit vessel 30 with the flashed vapors, for recondensation in condensor 40 and separation in overhead separator 50.

Referring to another recycling option shown in FIG. 1, condensed water from overhead separator 50 is pressurized by pump 57 and passed through line 58 for spraying into the top of vessel 30 through spray nozzle 59. This also results in the countercurrent contact of the condensed water with the flashed vapors flowing upwardly through flash vessel 30, and enhances the contact between these fluids. This recycle arrangement may be used in addition to, or instead of, the return of condensed water through line 56, i.e., more than one vapor-liquid contacting means may be provided in order to contact the water condensate recycled from overhead separator 50, with the water and light ends vapors rising through vessel 30.

Some of the condensed water from separator 50 will continue refluxing, i.e., from vessel 30 through condensor 40 and overhead separator 50 back into vessel 30; the remainder will pass as a liquid downwardly through vessel 30 and exit as part of a mixture of liquid water, liquid oil and any solids withdrawn from the bottom of vessel 30 through a line 36. However, due to the improvements of this invention, the amount of toxic light ends dissolved or entrained in the liquid water product will be substantially reduced.

Yet another recycle embodiment disclosed in FIG. 1 involves the recycle of condensed water from overhead separator 50 through lines 55 and 11 into emulsion tank 10. In this embodiment, the residual toxic light ends contained in the water condensate from separator 50 will pass again through the pressurization, heating and flashing steps of the process, enabling their concentration and eventual recovery from overhead separator 50 through line 54. These and other recycle choices may be used separately or in any combination. It is preferred to use a combination of (a) recycling a first portion of the water condensate to vessel 30 through either lines 55 and 56 to device 32, or through lines 55 and 58 to spray nozzle 59, together with (b) recycle of the remainder of the water condensate through lines 55 and 11 to emulsion tank 10. The first portion is preferably at least about 20 percent of the total water condensate produced, more preferably at least about 50 percent of the total water condensate produced, where a combination of recycle options are employed. The remainder of the water condensate would be recycled by one or more of the other routes.

As a further option where even lower light ends contents of produced water are needed or desired, another embodiment of my invention adds the step of injecting auxiliary steam [6] through a line 38 and a steam nozzle 39 into the vapor space of vessel 30 at a point below the entry level of the emulsion flashed through nozzle 20 in order to have the auxiliary steam [6] flow upwardly countercurrent to the downwardly flowing liquid water, liquid oil and any solids injected through nozzle 20. The amount of steam may vary as necessary, with typical amounts being between about 0.1 and about 0.33 of the amount of steam equivalent needed to heat the emulsion in heater 14. In this later embodiment, there may also be included a vapor-liquid-solids contacting device 33 to aid in the stripping action of the steam and thereby enhance the vaporization of residual light ends for production through overhead separator 50 and line 54. The design of contacting device 33 must be such that it will not be readily plugged with solids or with any heavy oil in the downwardly flowing fluid mixture. One such device is a baffle chamber having a series of inclined baffles arranged to allow cascading downward flow of the descending mixture in a meandering path from baffle to baffle, countercurrent to the upwardly flowing steam. Other suitable devices are also within the skill of the art given this disclosure of objectives. Of course, other gases or vapors could be used instead of steam, such as nitrogen or other inert gas, to achieve this stripping action. Such gases or vapors may exit the system through vent 52 if not condensed.

Figure 2:
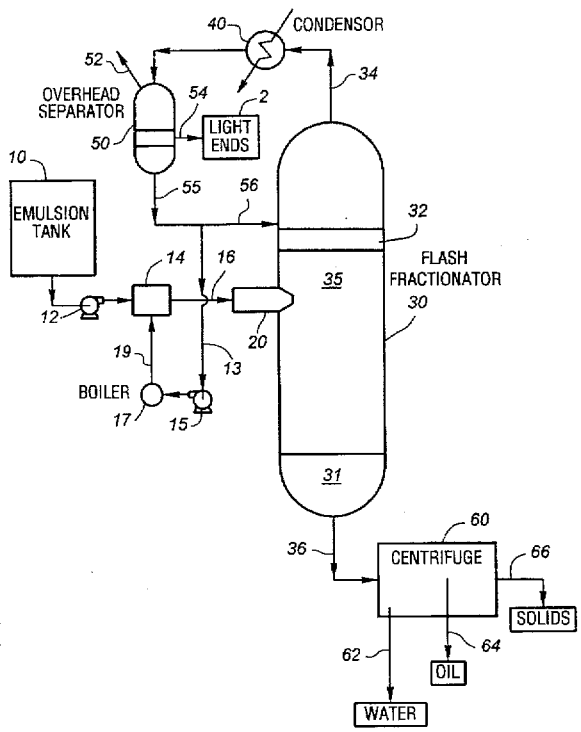

Referring now to FIG. 2, another recycle option of my invention involves returning a first portion of the condensed water from overhead separator 50 through lines 55 and 56 into vapor-liquid contacting device 32, as disclosed above in describing FIG. 1. The remainder of such condensed water is recycled through lines 55 and 13 (after pressurization by pump 15) into boiler 17 to create steam. This steam is then injected through line 19 into the emulsion feed either directly into heater 14 or (not shown) downstream of heater 14 in line 16, to accomplish some or all of the heating of the emulsion desired prior to flashing the same through nozzle 20. In this manner again, the residual toxic light cuds dissolved or entrained in the water condensate recycled through lines 55, 13 and 19 will be repressurized, reheated, and flashed for eventual recovery from overhead separator 50 through line 54.

The invention has been illustrated in FIGS. 1 and 2 on the basis of the toxic light ends having a lower specific gravity than the water condensate in overhead separator 50, and accordingly, the condensed water is shown to be drawn off from the bottom of that separator. It will be understood, of course, that some toxic light ends to be removed from previously used motor oils or the like, such as carbon tetrachloride or carbon disulfide, have specific gravities greater than water condensate, in which case the water condensate and light ends should, of course, be drawn off from appropriate levels of separator 50.

The temperatures and pressures of the various process steps should be selected to flash enough water from the feed emulsion in order to achieve the desired light ends removal, while minimizing the heat input needed. Normally, at least five percent of the water in the heated emulsion should be flashed overhead for processing in condensor 40 and overhead separator 50. Preferably, from about 5 to about 60 percent of the water in the heated emulsion is so flashed, more preferably from about 5 to about 30 percent, and most preferably from about 10 to about 25 percent. The emulsion to be treated by the process will normally be pressurized to a pressure above 50 psig, preferably from 50 to 250 psig, and then will be flashed through nozzle 20 to a pressure near atmospheric pressure, typically between about 1 and about 20 psig at the inlet to condensor 40, more preferably between about 5 and about 10 psig at the inlet to condensor 40. The pressurized emulsion will also be heated to a temperature at or near the boiling point of water at the pressure in line 16. Preferably the emulsion is heated to at least 105° C., more preferably between about 110° C. and about 200° C., and most preferably between about 140° C. and about 190° C.

For most situations as of this writing, it is possible to operate this invention so as to produce a toxic light ends content in the liquid water product below the appropriate safe discharge or usage contents. Where benzene is the principal toxic light end, contents of 10 wppm or less, preferably 1 wppm or less are needed and can be achieved. As used herein, the term "environmentally acceptable level" means that level of toxic light ends content which must be achieved to enable the operator to safely dispose of said liquid water product without concern for its light ends content.

As is disclosed in my U.S. Pat. No. 4,938,876, various chemical additives may be added at various points upstream or downstream of the flash vessel, or into the flash vessel itself in order to facilitate the separation of oil and water. These may include surfactants, flocculants, complexing agents, coagulants, precipitating agents, or the like. My patent discloses several of these additives and discloses their use in the overall separation process upon which this invention is an improvement. Such additives may also be used in this improved process to the extent that they do not hinder the objective of reducing the toxic light ends content of the separated water.

The invention is further described by the following example which is illustrative of a specific mode of practicing the invention and is not intended as limiting the scope of the invention as defined by the appended claims.

EXAMPLE

An oil refinery emulsion comprising 50 weight percent water, 48 weight percent crude oil containing benzene, and 2 weight percent finely divided siliceous and argillaceous solids is pressurized to 200 psig and heated to 195° C. by injection of steam; 800 wppm of an emulsion-breaking surfactant is injected; and the resulting fluid is passed through an in-line static mixer. The emulsion is then flashed through a Venturi nozzle and into a flash/fractionation vessel maintained at an overhead outlet pressure of 10 psig. About 10 percent of the entering emulsion is vaporized due to the flashing, with the vapor comprising steam and toxic light ends including benzene. This vapor rises upwardly through the vapor passages of a distillation tray wherein it is contacted with a water condensate flowing downwardly through the tray. The rising vapor passes into an overhead condensor wherein heat is extracted to condense essentially all of the vapor, and then into an overhead separator where the water and light ends condensed from the vapor are allowed to separate. The light ends are removed and used as a blending stock for fuels; the condensed water is recycled to the top of the distillation tray in order to flow downwardly through the flash/fractionation vessel, rejoining the major liquid stream. The liquid and solids collected in the bottom of the flash/fractionation vessel are withdrawn for processing in a tricanter centrifuge to produce separate streams of (1) a clean, essentially dry oil product, (2) a water-wet solids product, and (3) a water product having a benzene content less than 1 wppm.

It is readily apparent from this disclosure that the method of this invention is versatile and can be utilized to separate oil, water and solids from a wide variety of emulsions by proper selection of the operating conditions and of the process equipment. While particular embodiments of the invention have been described, it will be understood, of course, that the invention is not limited thereto since many obvious modifications can be made, and it is intended to include within this invention any such modification as will fall within the scope of the appended claims.

In the claims:

1. In a process for continuously separating water and oil from an emulsion containing the same, wherein said emulsion is pressurized and heated, and the resulting heated emulsion is flashed in a flash vessel in order to induce a partial vaporization of said water and the vaporization of a light ends fraction of said oil, thereby forming a vapor comprising vaporized water and said light ends, and residual liquid oil and water mixture is removed from said flash vessel and then processed to separate the same into a liquid water product and a liquid oil product, the improvement comprising: (a) condensing at least a major portion of said vapor to form a water condensate and a liquid light ends product, (b) separating said light ends product from said water condensate, (c) recycling at least a first portion of said water condensate to said flash vessel, and (d) recycling a second portion of said water condensate for admixture, after heating, pressurizing and converting to steam, with said emulsion at a point upstream of said flash vessel.

2. The process of claim 1 wherein said process further comprises countercurrently contacting said first portion of water condensate with said vapor as the latter is rising through the flash vessel.

3. The process of claim 2 wherein said first portion of water condensate is countercurrently contacted with the rising vapor by spraying said water condensate into the rising vapor.

4. The process of claim 2 wherein the water condensate is countercurrently contacted with the rising vapor by flooding said water condensate onto the top of a vapor-liquid contacting device disposed within said flash vessel; causing said water condensate to flow downwardly through said device; and causing said vapor to flow upwardly through said device.

5. The process of claim 1 wherein said second portion of water condensate is recycled for admixture with said emulsion at a point upstream of where said emulsion is pressurized and heated.

6. The process of claim 1 wherein said first portion of water condensate is recycled for admixture with said emulsion upstream of where said emulsion is pressurized and heated.

7. In a process for continuously separating water and oil from an emulsion containing the same, wherein said emulsion is pressurized and heated, and the resulting heated emulsion is flashed in a flash vessel in order to induce a partial vaporization of said water and the vaporization of a light ends fraction of said oil, thereby forming a vapor comprising vaporized water and said light ends, and residual liquid oil and water mixture is removed from said flash vessel and then processed to separate the same into a liquid water product and a liquid oil product, the improvement comprising: (a) condensing at least a major portion of said vapor to form a water condensate and a liquid light ends product, (b) separating said light ends product from said water condensate, (c) recycling at least a first portion of said water condensate, (d) injecting a stripping medium into said flash vessel at a location below the point at which said emulsion enters said flash vessel, and (e) causing said stripping medium to counter currently contact said residual liquid mixture within said flash vessel, so as to facilitate stripping of additional light ends from said residual liquid mixture.

8. The process of claim 7 wherein said countercurrent contact is accomplished at least in part by cascading said residual liquid mixture in a meandering path between a plurality of baffles disposed within said flash vessel and passing said stripping medium upwardly between said baffles.

9. In a process for continuously separating water and oil from an emulsion containing both the water and the oil as well as toxic light ends, wherein said emulsion is pressurized and heated, and the resulting heated emulsion is flashed in a flash vessel in order to induce a partial vaporization of said water and a vaporization of a major portion of said toxic light ends, thereby forming a vapor containing the same, and residual liquid mixture is removed from said flash vessel and then processed to separate the same into a liquid water product and a liquid oil product, the improvement comprising:

(a) conducting such pressurization, heating and flashing of said emulsion so as to vaporize between about 5 and about 60 percent of the water contained in said emulsion;

(b) removing said vapor from said flash vessel;

(c) condensing condensable portions of said vapor to form a water condensate and a light ends product, (d) separating said water condensate from said light ends product;

(e) recovering said light ends product;

(f) recycling said water condensate, and (g) countercurrently contacting at least a first portion of said water condensate so recycled with said vapor as said vapor rises through said flash vessel;

whereby said water condensate is recovered with said liquid water product; and the content of said toxic light ends in said liquid water product is reduced to an environmentally acceptable level.

10. The process of claim 9 wherein said first portion of said water condensate is countercurrently contacted with the rising vapor by spraying said water condensate into the rising vapor at or near the top of said flash vessel.

11. The process of claim 9 wherein said first portion of said water condensate is countercurrently contacted with the rising vapor by flooding said water condensate onto the top of a vapor-liquid contacting device disposed within said flash vessel; causing said condensate to flow downwardly through said device; and causing said vapor to flow upwardly through said device.

12. The process of claim 9 wherein said first portion of said water condensate is at least about 50 percent of the total water condensate produced, and wherein the improvement further comprises the step of recycling a second portion comprising the remainder of said water condensate for admixture with said emulsion at a point upstream of said flash vessel.

13. The process of claim 9 wherein the improvement further comprises the step of (h) injecting a stripping medium into said flash vessel at a location below the point at which said emulsion enters said flash vessel, and (i) causing said stripping medium to countercurrently contact said residual liquid mixture by cascading said residual liquid mixture in a meandering path between a plurality of baffles disposed within said flash vessel and passing said stripping medium upwardly between said baffles, so as to facilitate stripping of additional light ends fractions from said residual liquid mixture.

14. A process for continuously separating water, oil including benzene and solids from an emulsion containing the same, which comprises:

(a) pressurizing said emulsion to a pressure between about 50 and about 250 psig, and heating said emulsion to a temperature between about 110° C. and about 200° C.;

(b) flashing said emulsion into a flash vessel maintained at a pressure between about 5 and about 10 psig, so as to vaporize between about 5 and about 30 percent of the water contained in said emulsion to form (1) a vapor containing the vaporized water and at least a major portion of said benzene, and (2) a residual mixture of liquid water, liquid oil and solids;

(c) removing said vapor from said flash vessel;

(d) condensing said vapor to form water condensate and a light ends product containing the vaporized benzene;

(e) separating said water condensate from said light ends product;

(f) recovering said light ends product;

(g) recycling at least about 50 percent of said water condensate to said flash vessel, (h) countercurrently contacting said water condensate so recycled with said vapor as said vapor rises through said flash vessel;

(i) injecting stripping steam into said flash vessel at a location below the point at which said emulsion enters said flash vessel, (j) countercurrently contact said stripping steam with said residual mixture as said residual mixture descends within said flash vessel, thereby vaporizing additional benzene from said residual liquid mixture;

(k) removing the stripped residual mixture from said flash vessel; and (l) separating said stripped residual mixture into a solids product, a liquid oil product, and a liquid water product, whereby said liquid water product has a benzene content not greater than 1 wppm.

15. The process of claim 14 wherein the water condensate is countercurrently contacted with the rising vapor by spraying said water condensate into the rising vapor.

16. The process of claim 14 wherein the water condensate is countercurrently contacted with the rising vapor by flooding said water condensate onto the top of a vapor-liquid contacting device disposed within said flash vessel; causing said condensate to flow downwardly through said device; and causing said vapor to flow upwardly through said device.

17. The process of claim 14 further comprising the step of recycling a second portion comprising the remainder of said water condensate for admixture with said emulsion at a point prior to step (a).

* * * * *